UNITED STATES PATENT OFFICE 2,010,828

CHEMICAL COMPOUND AND PROCESS FOR PREPARING THE SAME

Henry S. Rothrock, Wilmington, Del., assignor to E. I. du Pont de Nemours & Company, Wilmington, Del., a corporation of Delaware No Drawing. Application August 18, 1932, Serial No. 629,305

23 Claims. (Cl. 260—134)

This invention relates to certain new compositions of matter, and the process for preparing them. The invention relates particularly to the products obtained by reacting vinyl ketones and compounds having the formula RXH, wherein X consists of from 1 to 3 atoms, said atoms being selected from the elements of the sixth group, sub-group B, of the periodic table and R is an organic group such as aryl, alkyl, aralkyl, acyl, thioacyl, etc.

This invention has for its object the preparation of certain new compositions of matter of the type R'C(O)CH₂CH₂XR, where R' is a hydrocarbon radical, R is an organic radical such as alkyl, aryl, acyl, etc. and X consists of from 1 to 3 atoms, said atoms being selected from the elements of the sixth group, sub-group B, of the periodic table. Other objects will appear hereinafter.

The following examples in which the proportions are parts by weight, illustrate the preferred forms of the invention. These examples are not to be construed as limiting the scope of the invention but are illustrative only.

*Example I.* R=C₂H₅  X=O

When 90 grams of methylvinyl ketone and 180 grams of absolute ethanol were heated together for five days at 50–60° C., a 39% conversion to ethyl ketobutyl ether was obtained. The reaction established an equilibrium and hence the conversion may be changed by changing the ratio of reactants. Ethyl ketobutyl ether was a clear colorless liquid boiling at 56–60° C. at 24 mm.

The equilibrium may be set up more rapidly by the use of cadmium metaphosphate as a catalyst. When equal weights of methylvinyl ketone and absolute ethanol were refluxed for 8 hours in the presence of 2% of cadmium metaphosphate based on the total weight of reactants, a 20% conversion was obtained. The same conversion was obtained when a similar charge was refluxed for 17½ hours which shows that the equilibrium was reached in the shorter time.

*Example II.* R=C₃H₇  X=S

Propyl mercaptan and methyvinyl ketone in equi-molecular amounts were refluxed for 1½ to 2 hours. On vacuum distillation an 82% yield of propyl ketobutyl sulfide was obtained boiling at 107–111° C. at 20 mm.

*Example III.* R=C₆H₅  X=O

Phenol (50 grams) and methylvinyl ketone (42 grams) were refluxed for 4 hours in the presence of 116 grams of concentrated hydrochloric acid dissolved in 1226 grams of water. A black oil which separated at the bottom of the flask was washed with warm water and distilled. A fraction boiling at 160–180° C. at 6 mm. (28 grams) was obtained which solidified to a white crystalline mass after long standing. A sample of this material before solidification showed the following composition on analysis:

|  | Per cent |
|---|---|
| Carbon | 73.74 |
| Hydrogen | 7.49 | as compared with the values calculated for the addition product:

|  | Per cent |
|---|---|
| Carbon | 73.13 |
| Hydrogen | 7.37 |

*Example IV.* R=C₆H₅  X=S

When thiophenol was added to an equimolecular amount of methylvinyl ketone there was considerable heat evolved. When the reaction was slowing down as indicated by gradual cooling, the mixture was refluxed for ½ hour and then distilled. An 82% yield of phenyl ketobutyl sulfide boiling at 145–148° C. at 2 mm. was obtained.

*Example V.* R=CH₃CO  X=O

One mol of methylvinyl ketone was refluxed for 24 hours with a mol of glacial acetic acid to which had been added two drops of water. When distilled, the ketobutyl acetate, 16% conversion, boiled at 98–102° C. at 30 mm.

*Example VI.* R=CH₃C₆H₄  X=SO₂

A solution of paratoluene sulfinic acid in alcohol was added to methylvinyl ketone in alcohol and the solution was heated to boiling for 5 minutes. When the solution was evaporated, a crystalline product was obtained melting at 70–71° C. This was identified as paratolyl ketobutyl sulfone.

Hydrogen sulfide also adds to methylvinyl ketone in the presence of sulfuric acid in the same way to yield ketobutyl mercaptan boiling at 92–96° C. at 53 mm.

In the examples cited above, there are illustrated four methods of procedure, viz., the use of stoichiometric amounts of the reactants on the one hand and excess of one reactant on the other hand, use of a catalyst, and use of a solvent. Any variation in procedure wherein the addition of RXH to methylvinyl ketone occurs may properly be considered within the scope of this invention.

Various catalysts may be used but I prefer to use those which are acid in character, such as acids themselves, or salts which in aqueous solution have a pH less than 7.

The above examples illustrate as compounds of the type RXH, the use of ethyl alcohol, propyl mercaptan, phenol, thiophenol, acetic acid, and para-toluene sulfinic acid. As further examples of compounds of the type RXH which may be condensed with methylvinyl ketone are saturated aliphatic monohydric alcohols such as methyl, lauryl, etc.; unsaturated aliphatic monohydric alcohols such as allyl and undecylenyl; aromatic monohydric alcohols such as benzyl and cinnamyl; alicyclic monohydric alcohols such as cyclohexyl and methylcyclohexyl; heterocyclic monohydric alcohols such as tetrahydrofurfuryl; aliphatic polyhydric alcohols such as glycol and glycerol; aliphatic ether alcohols such as methoxyethanol and monoethylin; aliphatic aromatic ether alcohols such as phenoxyethanol and monobenzylin, etc.; phenols such as cresol, resorcinol, para-hydroxy-diphenyl, alpha naphthol, etc.; aliphatic unsaturated monobasic acids such as acrylic and oleic; aliphatic saturated monobasic acids such as formic, lauric and stearic; monobasic aromatic acids such as benzoic and naphthoic; and per-acids such as per-acetic and per-benzoic acid. In addition the type RXH covers mercaptans such as ethyl and benzyl, thiophenols such as thio-cresol, thiolic acids ($CH_3COSH$), thionic acids ($CH_3CSOH$), thionthiolic acids ($CH_3CSSH$), and sulfinic acids, and alkyl and aryl selenium compounds such as ethyl selenol ($C_2H_5SeH$), and selenophenol ($C_6H_5SeH$).

Methylvinyl ketone has been illustrated in the examples as the preferred vinyl ketone. Other vinyl ketones containing in place of the methyl group, another alkyl group such as ethyl, propyl, butyl and the like, an alicyclic group such as cyclohexyl or an aryl group such as phenyl, can be used in the same reaction. The use of any vinyl ketone having the formula

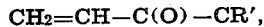
$$CH_2=CH-C(O)-CR',$$

in which the vinyl group is unsubstituted and in which R' is a hydrocarbon radical either aliphatic, alicyclic or aromatic, is within the scope of the invention.

In each of the above examples, as actually carried out, the methylvinyl ketone was stabilized against polymerization with hydroquinone. Other stabilizers or antioxidants may be used, such as pyrogallol, catechol, guaiacol, eugenol, and p-hydroxy-diphenyl.

The process of the present invention is ordinarily carried out by heating the reactants to a temperature varying from slightly above room temperature to boiling temperature. Many of the reactions proceed spontaneously, however, with the evolution of considerable heat.

The new compositions of matter may be used as solvents or plasticizers for cellulose derivatives since the ketone group confers good solubilizing action. The sulfur derivatives find use as acid inhibitors, flotation agents, rubber compounding ingredients, or as intermediates in the preparation of dyes, pharmaceuticals, and insecticides.

The advantage in this invention is that it presents a very simple process for obtaining hitherto unavailable ketobutyl derivatives. Compounds of this type can not be readily made by the ordinary processes for obtaining ethers or esters such as the reaction of halides with the sodium salts of alcohols or acids, because ketobutyl chloride loses hydrogen chloride very readily.

The above description and examples are to be taken as illustrative only and not as limiting the scope of the invention. Any modification or variation therefrom which conforms with the spirit of the invention is intended to be included within the scope of the claims.

I claim:

1. As new compositions of matter, compounds corresponding to the formula

$$R'C(O)CH_2CH_2XR$$

wherein X consists of from 1 to 3 atoms, said atoms being selected from the elements of the sixth group, sub-group B of the periodic table, R' is a hydrocarbon radical, and R is a hydrocarbon radical.

2. The compounds as described in claim 1 in which R' is an aliphatic hydrocarbon radical.

3. The compounds as described in claim 1 in which R' is a saturated aliphatic hydrocarbon radical.

4. The compounds as described in claim 1 in which R' is a methyl radical.

5. The compounds as described in claim 1 in which X is the atomic grouping $SO_2$, and R' is an aliphatic radical.

6. As a new compound, ketobutyl p-tolyl sulfone.

7. The compounds as described in claim 1 in which X is a single atom.

8. The compounds as described in claim 1 in which X is a single sulfur atom.

9. The compounds as described in claim 1 in which X is a single oxygen atom.

10. As a new compound, gamma ketobutyl phenyl sulfide.

11. As new compounds, alkyl gamma ketobutyl ethers.

12. As a new compound, ethyl gamma ketobutyl ether.

13. The process which comprises reacting a compound having the formula RXH in which "X" consists of from one to three atoms of an element or elements selected from the sixth group, sub-group "B" of the periodic table, said compound being a member of the class consisting of (1) compounds having the formula RXH in which "X" has the aforementioned significance and in which "R" is a hydrocarbon radical and (2) compounds having the formula RXH in which "X" has the aforementioned significance and in which "R" is an acyl radical, with a compound having the formula:

$$CH_2=CH-C(O)-R'$$

in which "R'" is a hydrocarbon radical.

14. The process as described in claim 13 in which X is a single atom.

15. The process as described in claim 13 in which X is a single oxygen atom.

16. The process of claim 13, characterized in that the reaction is carried on in the presence of an acid reacting catalyst.

17. The process of claim 13 characterized in that "R" is an acyl radical.

18. The process which comprises reacting a compound having the formula RXH in which R is a hydrocarbon radical, and X consists of from 1 to 3 atoms, said atoms being selected from the sixth group, sub-group B of the periodic table, with a compound having the formula

$$CH_2=CH-C(O)-R'$$

in which R' is a hydrocarbon radical.

19. The process as described in claim 18 in which R' is an aliphatic hydrocarbon radical.

20. The process as described in claim 18 in which R' is a saturated aliphatic hydrocarbon radical.

21. The process of claim 18, characterized in that the reaction is carried on in the presence of a catalyst comprising essentially a mineral acid.

22. The process of claim 18 characterized in that the reaction is carried out in alcohol solution in the presence of cadmium metaphosphate as a catalyst.

23. The process which comprises reacting a compound having the formula RXH in which R is an hydrocarbon radical and X consists of from 1 to 3 atoms, said atoms being selected from the sixth group, sub-group B of the periodic table, with methylvinyl ketone.

HENRY S. ROTHROCK.